Nov. 25, 1952     O. L. GUESTINGER     2,619,308
FISHING ROD HOLDER
Filed July 5, 1949
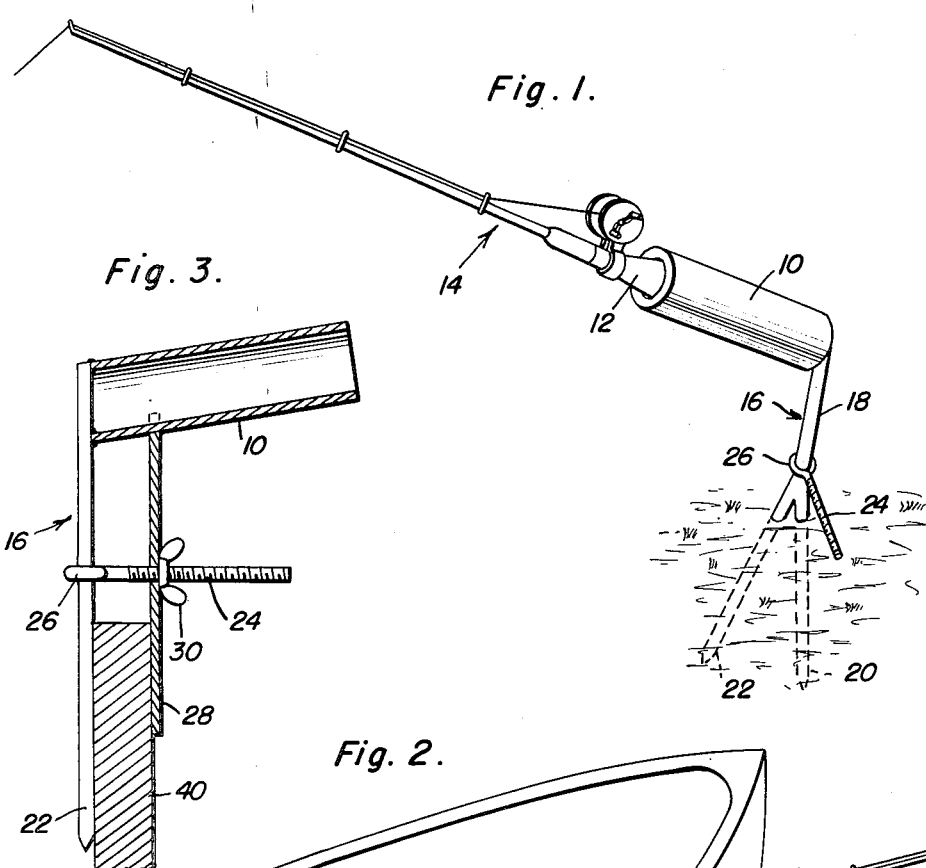
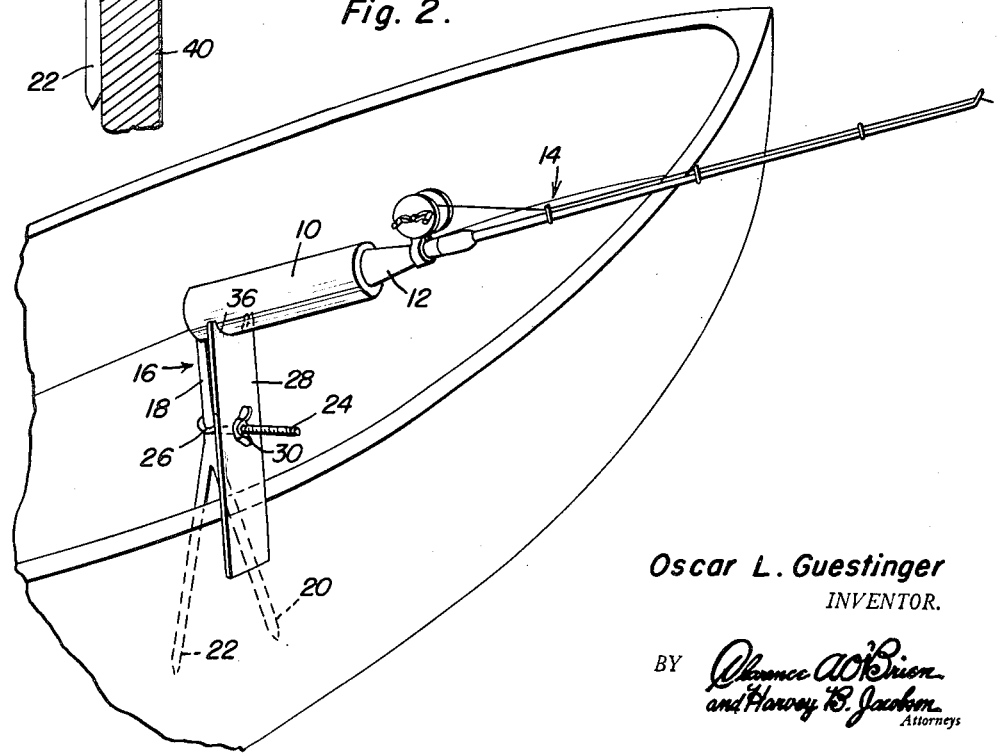
Oscar L. Guestinger
INVENTOR.

Patented Nov. 25, 1952

2,619,308

UNITED STATES PATENT OFFICE 2,619,308

FISHING ROD HOLDER

Oscar L. Guestinger, Ada, Okla.

Application July 5, 1949, Serial No. 103,006

2 Claims. (Cl. 248—42)

This invention relates to novel and useful improvements in holders for fishing rods.

An object of this invention is to selectively support a fishing rod on the side of a boat or in the ground by means of an improved holder which is inexpensive to manufacture, light in weight and which serves its intended function effectively.

Ancillary objects and features of novelty will become apparent to those skilled in the art, in following the description of the preferred form of the invention, illustrated in the accompanying drawings, wherein:

Figure 1 is a perspective view of the device, showing the same in use in one capacity;

Figure 2 is a perspective view of the invention showing the same in use in connection with a boat; and Figure 3 is an enlarged sectional view of the device with the fishing rod removed.

In the support of fishing rods while fishing, it is not always necessary or desirable to hold or support them manually. Accordingly, certain devices for mechanically holding fishing rods while other sundry operations are performed have been fabricated.

In the instant holder, there is a sleeve 10 provided for the support of the handle 12 of the fishing rod, generally indicated at 14. This sleeve is disposed at an angle with respect to the horizontal (Figure 3) and has a support, generally indicated at 16, disposed at the rear end thereof. Support 16 includes a shank 18 which is welded or otherwise rigidly secured to the rear open end of the sleeve 10 and has diverging legs 20 and 22, respectively. These legs are preferably sharpened at their ends so that they may be rather easily inserted into the ground as disclosed in Figure 1.

There is an eye bolt 24 with its eye portion 26 disposed around the shank 18. The eye bolt 24 passes through an opening in the clamping plate 28 which is adapted to cooperate with the legs 20 and 22 in forming a clamp for the entire device. A wing nut or a suitable equivalent member 30 is disposed on the eye bolt so as to press the clamping plate 28 close to the support 16.

The upper end of the clamping plate 28 has a recess 36 therein so that it will accommodate the lower surface of the sleeve 10. As noted in Figure 3, upon tightening the wing nut 30, the plate 28 will be pressed toward the legs 20 and 22 through the reaction of the eye bolt 24, whereby a wedging action takes place, the lower end of the clamping plate 28 being engaged with the side 40 of the boat, while the upper end is clampingly engaged with the sleeve 10.

In operation, the device is either inserted in the ground as disclosed in Figure 1 or fastened to a part of a boat as disclosed in Figure 2. The device may be fastened to other suitable elements such as parts of bridges, and the like. After insertion of the device in the ground or after clamping it to a relatively stationary member, the fishing pole is simply inserted in the sleeve 10 so that the handle is maintained firmly therein.

Having described the invention, what is claimed as new is:

1. In a fishing rod holder, a support comprising a shank having diverging legs at one end thereof, the outer ends of said legs constituting a turf piercing means, an open ended sleeve fixed at one end to said shank, the shank overlying a part of said one end to thereby constitute a back wall for one end of said sleeve, said sleeve having a longitudinal axis which is located with respect to said shank so that the included angle therebetween is obtuse whereby a fishing rod located in the bore of said sleeve has its axis also arranged at an obtuse angle with respect to said shank, a clamping plate connected with said sleeve and arranged parallel to said shank, said plate having a recess in its upper edge within which said sleeve is located, and means connected with said shank and said plate for drawing said plate close to said shank, thereby constituting a clamp for said sleeve.

2. The combination of claim 1 and said last mentioned means comprising a screw with an eye at one end thereof, said shank being passed through said eye, said plate having an aperture therein through which said screw passes, and a nut secured on said screw.

OSCAR L. GUESTINGER.

REFERENCES CITED

The following references are of record in the file of this patent:

UNITED STATES PATENTS

| Number | Name | Date |
|---|---|---|
| 840,406 | Williams | Jan. 1, 1907 |
| 946,147 | Mohrhoff | Jan. 11, 1910 |
| 1,520,543 | Meachen | Dec. 23, 1924 |
| 2,033,007 | Raithel | Mar. 3, 1936 |

FOREIGN PATENTS

| Number | Country | Date |
|---|---|---|
| 210,922 | Great Britain | Feb. 14, 1924 |